(12) United States Patent
Lee

(10) Patent No.: US 11,467,768 B2
(45) Date of Patent: Oct. 11, 2022

(54) DATA STORAGE DEVICE FOR STORING BOOT PARTITION DATA READ FROM MEMORY DEVICE IN BUFFER MEMORY AND METHOD OF OPERATING THE SAME

(71) Applicant: SK hynix Inc., Icheon-si (KR)

(72) Inventor: Jeong Woo Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/082,755

(22) Filed: Oct. 28, 2020

(65) Prior Publication Data
US 2021/0365207 A1    Nov. 25, 2021

(30) Foreign Application Priority Data

May 21, 2020  (KR) .................. 10-2020-0061135

(51) Int. Cl.
*G06F 3/06*      (2006.01)
*G06F 9/4401*    (2018.01)
*G06F 8/61*      (2018.01)

(52) U.S. Cl.
CPC .......... *G06F 3/0656* (2013.01); *G06F 3/0613* (2013.01); *G06F 3/0622* (2013.01); *G06F 3/0644* (2013.01); *G06F 3/0659* (2013.01); *G06F 3/0679* (2013.01); *G06F 8/61* (2013.01); *G06F 9/4406* (2013.01)

(58) Field of Classification Search
CPC .... G06F 3/0656; G06F 3/0613; G06F 3/0622; G06F 3/0644; G06F 3/0659; G06F 3/0679; G06F 8/61; G06F 9/4406
See application file for complete search history.

(56) References Cited

U.S. PATENT DOCUMENTS

| | | | | |
|---|---|---|---|---|
| 10,229,271 B2 * | 3/2019 | Kim | ............... | H04L 9/3247 |
| 10,810,311 B2 * | 10/2020 | Kim | ............... | G06F 12/1458 |
| 11,200,327 B1 * | 12/2021 | Tripathy | ............... | G06F 21/53 |
| 2002/0136078 A1 * | 9/2002 | Garner | ............... | G06F 12/0246 |
| | | | | 711/E12.008 |
| 2002/0144066 A1 * | 10/2002 | Talreja | ............... | G11C 16/26 |
| | | | | 711/103 |

(Continued)

FOREIGN PATENT DOCUMENTS

| KR | 10-0626361 B | 9/2006 |
|---|---|---|
| KR | 10-2014-0121233 A | 10/2014 |

*Primary Examiner* — Ramon A. Mercado
(74) *Attorney, Agent, or Firm* — Perkins Coie LLP

(57) ABSTRACT

Provided herein may be a data storage device and a method of operating the same. The data storage device having improved response speed may include a buffer memory configured to hold data, a memory device including a user area reserved for storing user data from a host and configured to be accessed by a first procedure, and a boot partition area reserved for storing boot partition data and configured to be accessed by a second procedure different from the first procedure and a memory controller coupled to and in communications with the buffer memory and memory device and configured to, upon receipt of power from a power supply, control the buffer memory and the memory device to perform a preloading operation by storing, in the buffer memory, part of boot partition data from the boot partition area before a request from the host is received.

19 Claims, 12 Drawing Sheets

(56) References Cited

U.S. PATENT DOCUMENTS

| | | | |
|---|---|---|---|
| 2006/0069825 A1* | 3/2006 | Hodder | G06K 15/02 710/72 |
| 2007/0113228 A1* | 5/2007 | Raghunath | G06F 9/441 718/1 |
| 2012/0102314 A1* | 4/2012 | Zheng | G06F 9/4411 713/2 |
| 2016/0210457 A1* | 7/2016 | Cleeton | G06F 21/575 |
| 2017/0185781 A1* | 6/2017 | Kim | G06F 9/4406 |
| 2019/0065752 A1* | 2/2019 | Li | G06F 1/3296 |
| 2019/0213012 A1* | 7/2019 | Chen | G06F 9/4406 |
| 2019/0340058 A1* | 11/2019 | Sasidharan | G06F 11/079 |
| 2020/0026682 A1* | 1/2020 | Thomas | G06F 11/1417 |
| 2020/0104067 A1* | 4/2020 | Shaharabany | G06F 9/4416 |
| 2021/0096621 A1* | 4/2021 | Agrawal | G06F 1/24 |
| 2021/0157499 A1* | 5/2021 | Liu | G06F 3/0653 |
| 2021/0240487 A1* | 8/2021 | Vidyadhara | G06F 12/06 |
| 2021/0365207 A1* | 11/2021 | Lee | G06F 3/0613 |

\* cited by examiner

| Bootpartition ID | Activation Information | Security-related Information | Update Information |
|---|---|---|---|
| Bootpartition 1(0h) | Active | Locked | New |
| Bootpartition 2(1h) | Inactive | Locked | Old |

DATA STORAGE DEVICE FOR STORING BOOT PARTITION DATA READ FROM MEMORY DEVICE IN BUFFER MEMORY AND METHOD OF OPERATING THE SAME

CROSS-REFERENCE TO RELATED APPLICATION

This patent document claims priority to and benefits of the Korean patent application number 10-2020-0061135, filed on May 21, 2020, which is incorporated herein by reference in its entirety.

TECHNICAL FIELD

The embodiments of the disclosed technology generally relate to an electronic device, and more particularly to a data storage device and a method of operating the data storage device.

BACKGROUND

A data storage device is used to temporarily or permanently store data under the control of a host device such as a computer or a smartphone. The data storage device may include a memory device or memory medium for storing data and a memory controller that manages the flow of data going to and from the memory device.

Memory devices may be classified into volatile memory devices and nonvolatile memory devices depending on whether data can be retained in absence of power. The volatile memory device only retains its data while the device is powered and loses its data when power is lost. Examples of the volatile memory device may include a static random access memory (SRAM) and a dynamic random access memory (DRAM).

The nonvolatile memory device can retain stored data even in the absence of power and thus does not lose its data when power is lost. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

The embodiments of the disclosed technology relate to a data storage device with improved response speed and a method of operating the data storage device.

An embodiment of the disclosed technology may provide for a data storage device. The data storage device may include a buffer memory configured to hold data, a memory device including a user area reserved for storing user data from a host and configured to be accessed by a first procedure, and a boot partition area reserved for storing boot partition data and configured to be accessed by a second procedure different from the first procedure and a memory controller coupled to and in communications with the buffer memory and memory device and configured to, upon receipt of power from a power supply, control the buffer memory and the memory device to perform a preloading operation by storing, in the buffer memory, part of boot partition data from the boot partition area before a request from the host is received.

An embodiment of the disclosed technology may provide for a memory controller for controlling a memory device under control of a host. The memory controller may include a buffer memory configured to hold data and a boot partition manager coupled to and in communication with the buffer memory and the memory device, and configured to, upon receipt of power from a power supply, control the buffer memory and the memory device to perform a preloading operation by storing, in the buffer memory, part of boot partition data from a boot partition area included in the memory device before a request from the host is received.

In some implementations, the data storage device may include a buffer memory, a memory device including a user area in which user data provided from a host is stored, and a boot partition area that is accessed in a manner different from that of the user area, and a memory controller configured to, when power is supplied, control the buffer memory and the memory device so that a preloading operation of storing part of boot partition data, stored in the boot partition area, in the buffer memory is performed before a request from the host is received.

In some implementations, the memory controller may include a buffer memory, and a boot partition manager configured to, when power is supplied, control the buffer memory and the memory device so that a preloading operation of storing part of boot partition data, stored in a boot partition area included in the memory device, in the buffer memory is performed before a request from the host is received.

BRIEF DESCRIPTION OF THE DRAWINGS

FIG. 5 is a diagram illustrating an example of boot partition status information stored in a boot partition status register of FIG. 4.

DETAILED DESCRIPTION

The technology disclosed in this patent document can be implemented in some embodiments to provide data storage devices and their operating methods that, among other features and benefits, can improve the response speed of the operations associated with boot partition.

Figure 1:
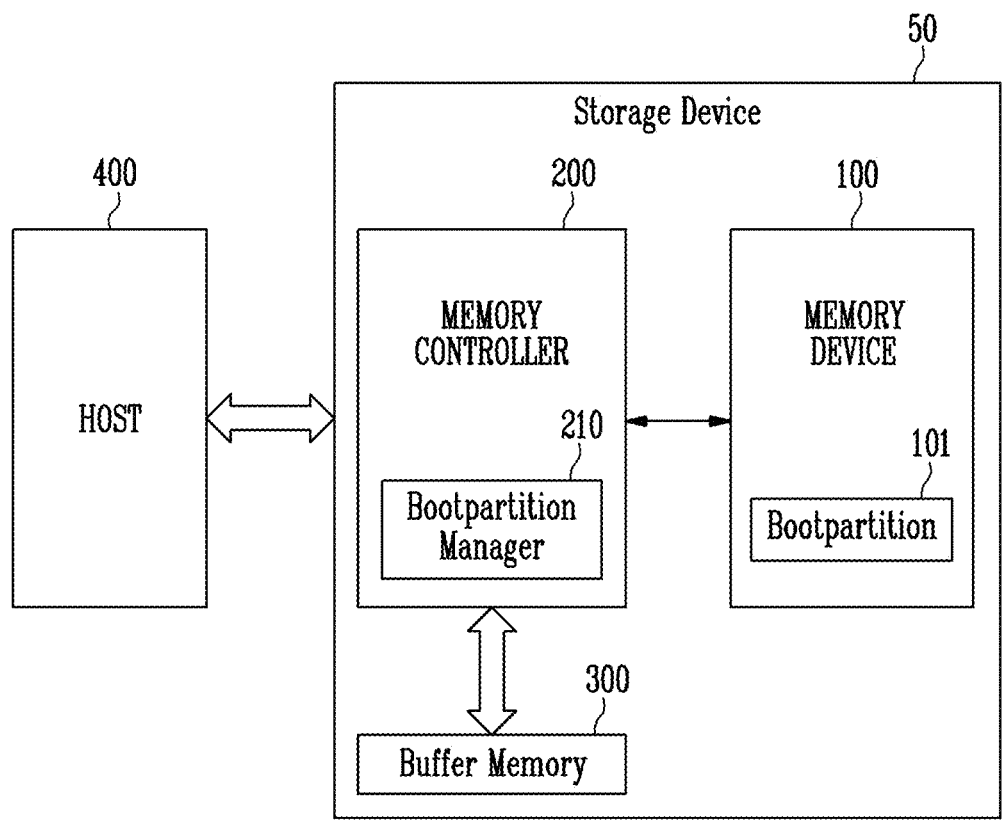
FIG. 1 is a diagram illustrating a data storage device based on an embodiment of the disclosed technology.

FIG. 1 is a diagram illustrating a data storage device based on an embodiment of the disclosed technology.

Referring to FIG. 1, a data storage device 50 may include a memory device 100 and a memory controller 200 which controls the operation of the memory device 100. The data storage device 50 may be a device which stores data under the control of a host 400, such as a mobile phone, a smartphone, an MP3 player, a laptop computer, a desktop computer, a game console, a TV, a tablet PC, or an in-vehicle infotainment system.

The data storage device 50 may be implemented in any one of various types of data storage devices that is compatible to a host interface in communication with the host 400. Examples of the data storage device 50 may include a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) data storage device, a universal flash storage (UFS) device, a personal computer memory card international association (PCMCIA) card-type data storage device, a peripheral component interconnection (PCI)-card type data storage device, a PCI express (PCI-E) card-type data storage device, a compact flash (CF) card, a smart media card, and a memory stick.

The package types for the data storage device 50 may include package on package (POP), system in package (SIP), system on chip (SOC), multi-chip package (MCP), chip on board (COB), wafer-level fabricated package (WFP), and wafer-level stack package (WSP).

The memory device 100 may be operated to store data in response to commands and instructions of the memory controller 200. The memory device 100 may include a memory cell array (not illustrated) including a plurality of memory cells configured to store data.

Each of the memory cells may be implemented or operated as a single-level cell (SLC) capable of storing one data bit per cell, a multi-level cell (MLC) capable of storing two data bits per cell, a triple-level cell (TLC) capable of storing three data bits per cell, or a quad-level cell (QLC) capable of storing four data bits per cell.

The memory cell array (not illustrated) may include a plurality of memory blocks. Each memory block may include a plurality of pages, each of which includes a plurality of memory cells. In some implementations, the memory block may be the smallest unit that can be erased, and the page may be the smallest unit that can be programmed (or written to) or read.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). By way of example, the memory device 100 may be a NAND flash memory.

The memory controller 200 can access the memory device 100 by providing a command CMD and an address ADDR corresponding to the desired memory area of the memory cell array. The memory device 100 may perform operations as instructed by the command CMD on the area selected by the address ADDR. For example, the memory device 100 may perform a write operation (i.e., a program operation), a read operation, and an erase operation. During a program operation, the memory device 100 may write data to the memory area selected by the address ADDR. During a read operation, the memory device 100 may read data from the area selected by the address ADDR. During an erase operation, the memory device 100 may erase a certain memory region (e.g., selected block) selected by the address ADDR.

The memory controller 200 may control the overall operation of the data storage device 50.

During a power up procedure of the data storage device 50, the memory controller 200 may run firmware (FW) to make use of the memory device 100 in the data storage device 50. When the memory device 100 is a flash memory device, the firmware (FW) may include a host interface layer (HIL) which controls communication with the host 400, a flash translation layer (FTL) which controls communication between the host 400 and the memory device 100, and a flash interface layer (FIL) which controls communication with the memory device 100.

In an embodiment, the memory controller 200 may receive data and a logical block address (LBA) from the host 400, and may translate the logical block address (LBA) into a physical block address (PBA) indicating the physical locations of memory cells in the memory device 100. In the context of this patent document, the terms "logical block address (LBA)" and "logical address" may be used to indicate addresses generated by a controller inside or outside the memory device to be mapped to actual locations where data is to be written to or read, and the terms "physical block address (PBA)" and "physical address" may be used to indicate the actual location.

The memory controller 200 may control the memory device 100 so that a program operation, a read operation or an erase operation is performed in response to a request received from the host 400. During a program operation, the memory controller 200 may provide a write command, a physical block address (PBA), and data to the memory device 100. During a read operation, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may autonomously generate a command, an address, and data regardless of a request from the host 400, and may transmit the command, address and data to the memory device 100. For example, the memory controller 200 may provide the memory device 100 with commands, addresses, and data to perform read operations and program operations that are involved in FTL algorithms such as wear leveling, read reclaim, and garbage collection.

In an embodiment, the memory controller 200 may control at least two memory devices 100 that are operated concurrently. In this case, the memory controller 200 may utilize an interleaving scheme to improve operating performance by parallelizing the memory request with respect to the two or more memory devices 100.

The buffer memory 300 may temporarily store data provided from the host 400 or data read from the memory device 100. In an embodiment where the buffer memory 300 is a volatile memory device, the buffer memory 300 may be a dynamic random access memory (DRAM) or a static random access memory (SRAM).

In an embodiment, the memory controller 200 may store, in the buffer memory 300, system data read from the memory device 100. For example, during a power up procedure or initial configuration procedure of the data storage device 50, the memory controller 200 may load the system data, stored in the memory device 100, into the buffer memory 300. The system data may include setting information required to control the data storage device 50. For example, the system data may contain firmware data of the memory controller 200. As another example, the system data may include bad block data associated with bad blocks, among the plurality of memory blocks included in the memory device 100. In an embodiment, the system data may contain map data (e.g., lookup table defining the mapping of addresses) indicating the mapping between logical addresses provided by the host 400 and physical addresses of memory cells included in the memory device 100, and valid page table data indicating whether data stored in the pages included in the memory device 100 is valid data. In an embodiment, the system data may contain read count data indicating how many times read operations have been performed on the memory blocks included in the memory device 100. The system data may also include program/erase cycle data (e.g., P/E cycle) indicating how many times erase operations have been performed on the memory blocks included in the memory device 100. The system data may also include hot/cold data indicator regarding whether the data stored in the pages included in the memory device 100 is hot data or cold data, and journal data indicating content changed in the map data.

FIG. 1 illustrates one implementation in which the buffer memory 300 is located outside the memory controller 200. Alternatively, the buffer memory 300 may be included in and as part of the memory controller 200 in various embodiments.

In an embodiment, when the data storage device 50 stores an operating system (OS) of the host 400, the operating system (OS) may be user data stored in a user area, rather than system data. In this case, during a booting operation, the host 400 may read the OS stored in the data storage device 50, and may boot using data about the read OS.

In an embodiment of the disclosed technology, the data storage device 50 may support a boot partition function. The boot partition function may include providing a boot loader that runs on the ROM of the host 400. A boot partition may be an area that can be accessed by the host without initializing the queue of the memory controller 200. In an embodiment, boot partition data stored in a boot partition (Bootpartition) 101 may be characterized as system data.

The boot partition 101 may be allocated to some of the memory blocks included in the memory device 100.

The boot partition 101 may be accessed in response to special commands that are different from the commands for accessing other regular memory blocks (e.g., memory blocks included in the user area) included in the memory device 100. That is, the host 400 may access the boot partition 101 using a dedicated command for accessing the boot partition 101.

In an embodiment, the host 400 may store, in the boot partition 101, an OS (i.e., secondary OS) different from a default operating system (OS) or a boot loader for a debugging mode, and may load the stored OS or boot loader if necessary. That is, the data stored in the boot partition 101 may provide a means for allowing the host 400 to boot in a booting environment other than that of the default operating system (OS).

In an embodiment, in order for the boot loader to boot, a dedicated command for accessing the boot partition may be used. In some implementations, the boot partition may allow the host to boot using only the data stored in the boot partition, without writing a boot image from the data storage device to an additional storage area.

The memory controller 200 may include a boot partition manager 210. The boot partition manager 210 may store data in the boot partition 101 or provide the data stored in the boot partition 101 to the host 400. The boot partition manager 210 may access the boot partition 101 in response to a request from the host 400.

In an embodiment of the disclosed technology, the boot partition manager 210 may read the boot partition data from the boot partition 101, and store the read boot partition data in the buffer memory 300 when power is supplied to the data storage device 50 even if a request is not received from the host 400. In some implementations, the boot partition manager 210 may control the boot partition 101 and the buffer memory 300 so that the boot partition data, which is stored in the boot partition 101, is preloaded prior to receiving a request from the host 400. In the context of this patent document, the word "preload" can be used to indicate that software is loaded or starts to be loaded before an instruction or request triggering the corresponding software is received.

The host 400 may communicate with the data storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
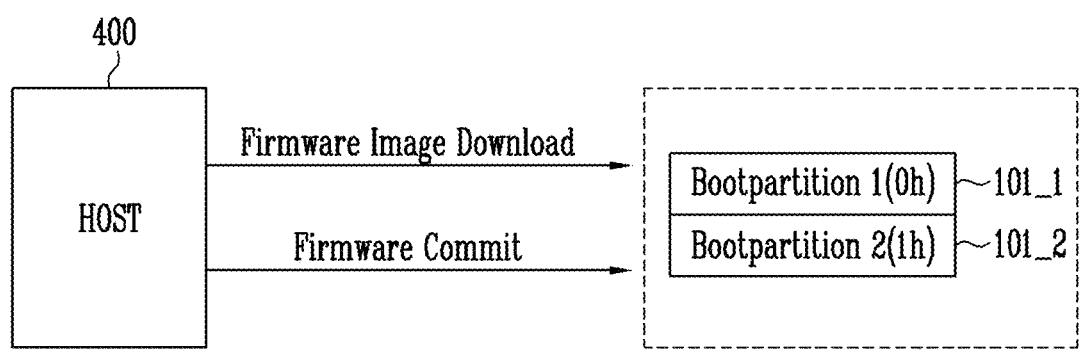
FIG. 2 is a diagram illustrating an example of a boot partition that holds files for a host.

FIG. 2 is a diagram illustrating an example of a boot partition that holds files for a host.

Referring to FIGS. 1 and 2, a plurality of boot partitions may be present, and the data storage device 50 illustrated in FIG. 1 may include two or more boot partitions. Here, the boot partitions may have data storage spaces of the same size. For example, one boot partition may have a size of 32 MB. In an embodiment, the size of one boot partition may be smaller than that of one memory block included in the memory device 100. Therefore, one memory block may include a plurality of boot partitions. In various embodiments, the boot partitions may have data storage spaces of different sizes.

In FIG. 2, it is assumed that the data storage device 50 includes a first boot partition Bootpartition 1(0h), 101_1 and a second boot partition Bootpartition 2(1h), 101_2.

The host 400 may store data in the boot partitions in response to a dedicated command. For example, the host 400 may store data in the boot partitions in response to a firmware image download command and a firmware commit command. In various embodiments, the boot partitions may be accessed only when the access is authorized or the host is authenticated using an authorization key or an authentication key.

The host 400 may issue the firmware image download command to provide boot partition data to be stored in each boot partition to the memory controller 200. In an embodiment, the boot partition data to be provided by the host 400 to the boot partition manager 210 may include a plurality of portions. Therefore, offsets for specifying respective portions may be included in the firmware image download command. The host 400 may provide the boot partition data to be stored in each boot partition. In an embodiment, the host 400 and the boot partition manager 210 may authenticate access to the boot partition and set the boot partition to an unlocked state in order to store data in the corresponding boot partition.

Thereafter, the host 400 may instruct the provided boot partition data to replace existing content stored in the boot partition by providing the firmware commit command. In an embodiment, the firmware commit command may include information about the identifier (ID) of the boot partition to be replaced. When the boot partition manager 210 replaces the existing content of the boot partition with the provided boot partition data, the host 400 may provide a firmware commit command including the ID of the boot partition to be set to an activate state to the boot partition manager 210.

Figure 3:
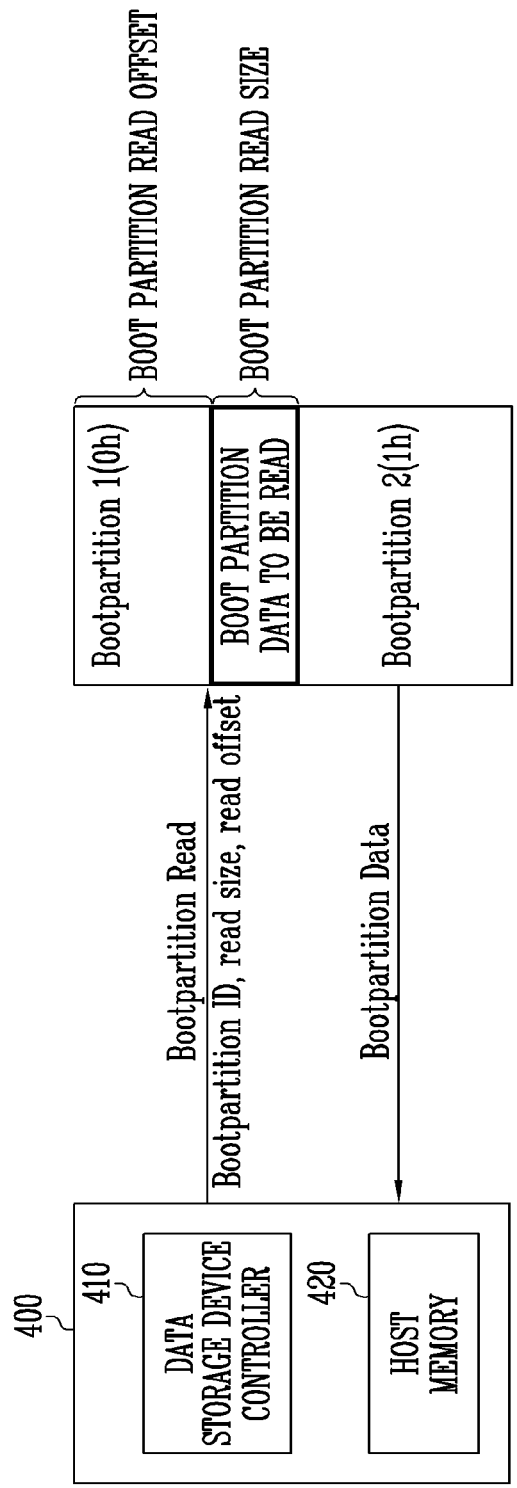
FIG. 3 is a diagram illustrating an example of a boot partition that provides files (e.g., boot partition data) to a host.

FIG. 3 is a diagram illustrating an example of a boot partition operation or process that includes providing boot partition data to a host.

Referring to FIGS. 1 and 3, the host 400 may include a data storage device controller 410 which controls the data storage device 50, and a host memory 420. The host memory 420 may be a volatile memory device. For example, the host memory 420 may be a dynamic random access memory (DRAM) or a static random access memory (SRAM).

The data storage device controller 410 may allocate a boot partition memory buffer to the inside of the host memory 420, and may control the boot partition manager 210 so that the boot partition manager 210 copies data stored in each boot partition. The data storage device controller 410 may generate the address of the allocated boot partition memory buffer, the ID of a boot partition from which data is to be read, read size, and a read offset. Thereafter, the data storage device controller 410 may provide a read request to the boot partition manager 210.

The boot partition manager 210 may read data from the boot partition requested by the host, and may provide the read boot partition data to the host memory 420.

Figure 4:
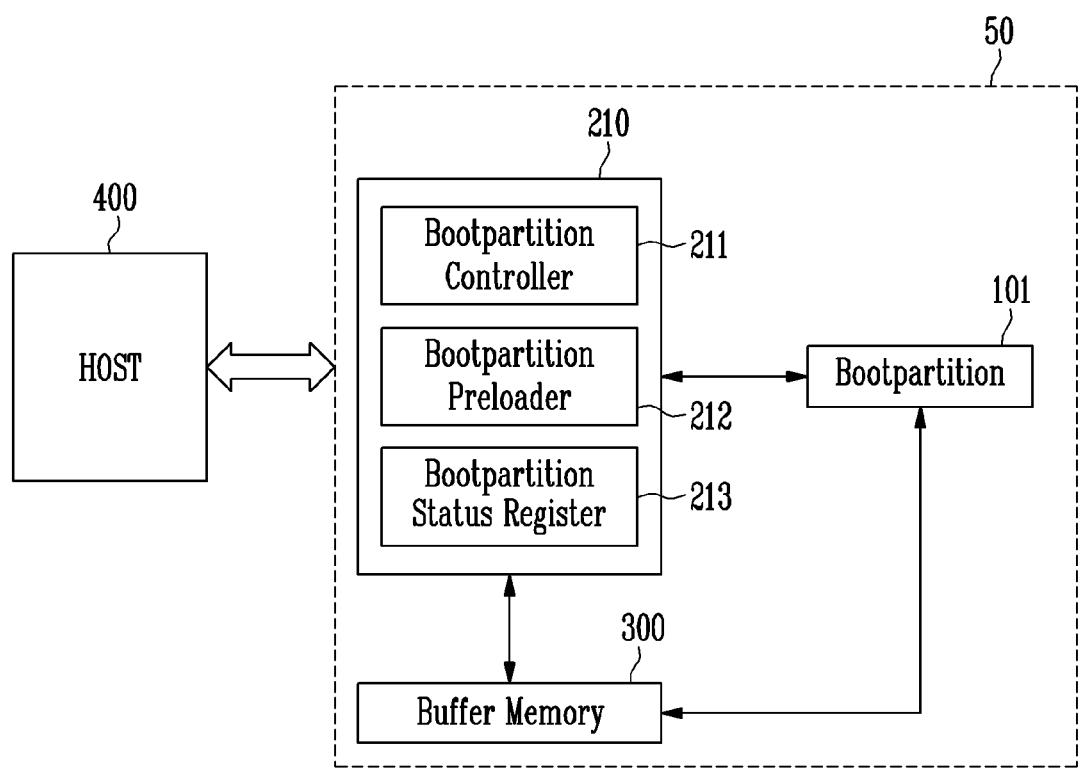
FIG. 4 is a block diagram illustrating an example of a data storage device implemented based on an embodiment of the disclosed technology.

FIG. 4 is a block diagram illustrating an example of a data storage device implemented based on an embodiment of the disclosed technology.

In some implementations, the data storage device 50 may include a boot partition manager 210, a boot partition 101, and a buffer memory 300.

The boot partition manager 210 may include a boot partition controller 211, a boot partition preloader 212, and a boot partition status register 213.

In some embodiments of the disclosed technology, the method described above with reference to FIG. 2 may be implemented in the storage device 50 so that a host 400 may store boot partition data in the boot partition 101. In an embodiment, the boot partition data may be an OS (e.g., a secondary OS) different from a default operating system (OS) of the host 400, or a boot loader for a debugging mode. In an embodiment, the boot partition data may include data irrelevant to the booting of the host 400. In this case, the boot partition data may include data to be written or read by the host 400 in response to a dedicated command.

By storing the boot partition data in the boot partition 101, the host 400 can load the boot partition data from the boot partition 101 without loading the default OS in a subsequent booting process.

In an embodiment of the disclosed technology, the memory controller 200 may perform a preloading operation to read the data from the boot partition and store the read data to the buffer memory 300 prior to receiving a read request for the boot partition data from the host 400. Thereafter, when the read request for the boot partition data is received from the host 400, the memory controller 200 may provide the boot partition data from the buffer memory 300 to the host 400. By storing the data in the buffer memory 300 in advance, the host 400 can save the time that would have been spent reading the data from the boot partition to the buffer memory 300.

In some implementations, the boot partition controller 211, may, in response to the request from the host, store data to the boot partition 101 or read the data from the boot partition 101 to provide the read data to the host 400.

When there is a change in the data stored in the boot partition 101, the boot partition controller 211 may update boot partition status information stored in the boot partition status register 213. In an embodiment, the boot partition status information may include at least one of a boot partition ID, activation information indicating whether data stored in the boot partition is activated, security-related information of the boot partition data, and boot partition update information.

The boot partition controller 211 may store the boot partition status information from the boot partition register 213 to a system block included in the memory device 100 either periodically or randomly.

When power is supplied to the data storage device 50, the boot partition preloader 212 may read the boot partition status information from the system block included in the memory device 100, and may store the read boot partition status information in the boot partition status register 213.

The boot partition preloader 212 may determine, based on the boot partition status information, whether prestored boot partition data is present. Upon determination that the prestored boot partition data is present, the boot partition preloader 212 may provide the memory device 100 with a read command requesting the memory device 100 to read part of the corresponding boot partition data. That is, the boot partition preloader 212 may preload the part of the boot partition data into the buffer memory 300.

Thereafter, when a read request for the boot partition data is received from the host 400, the boot partition preloader 212 may provide the preloaded boot partition data to the host 400.

In an embodiment, when there are two or more boot partitions, the boot partition preloader 212 may preload the most recently stored boot partition data.

FIG. 5 is a diagram illustrating an example of boot partition status information stored in the boot partition status register of FIG. 4.

In some implementations, the boot partition status information may include at least one of a boot partition ID, activation information indicating whether data stored in a boot partition is activated, security-related information of boot partition data, and boot partition update information.

The boot partition ID may include an identification number for identifying each boot partition out of a plurality of boot partitions. The activation information may indicate whether the host 400 has prestored the boot partition data before the host 400 is powered off. The activation information in an activate state may indicate that part or all of the boot partition data has been normally stored.

Therefore, the boot partition preloader 212, described above with reference to FIG. 4, may preload the boot partition data in the active state.

The security-related information may be information indicating status as to whether boot partition data may be stored or updated. The host 400 may set the security-related information of a boot partition to an unlocked state through authentication before storing boot partition data, may store the boot partition data in the corresponding boot partition, and may then set the security-related information of the boot partition to a locked state through authentication.

In some implementations where there are a plurality of sets of boot partition data, the update information may include information indicating the most recently stored set of boot partition data, among the plurality of sets of boot partition data. When two or more sets of boot partition data are in an active state, the boot partition preloader may determine one or more of the plurality of sets of boot partition data to be preloaded based on the update information.

Figure 6:
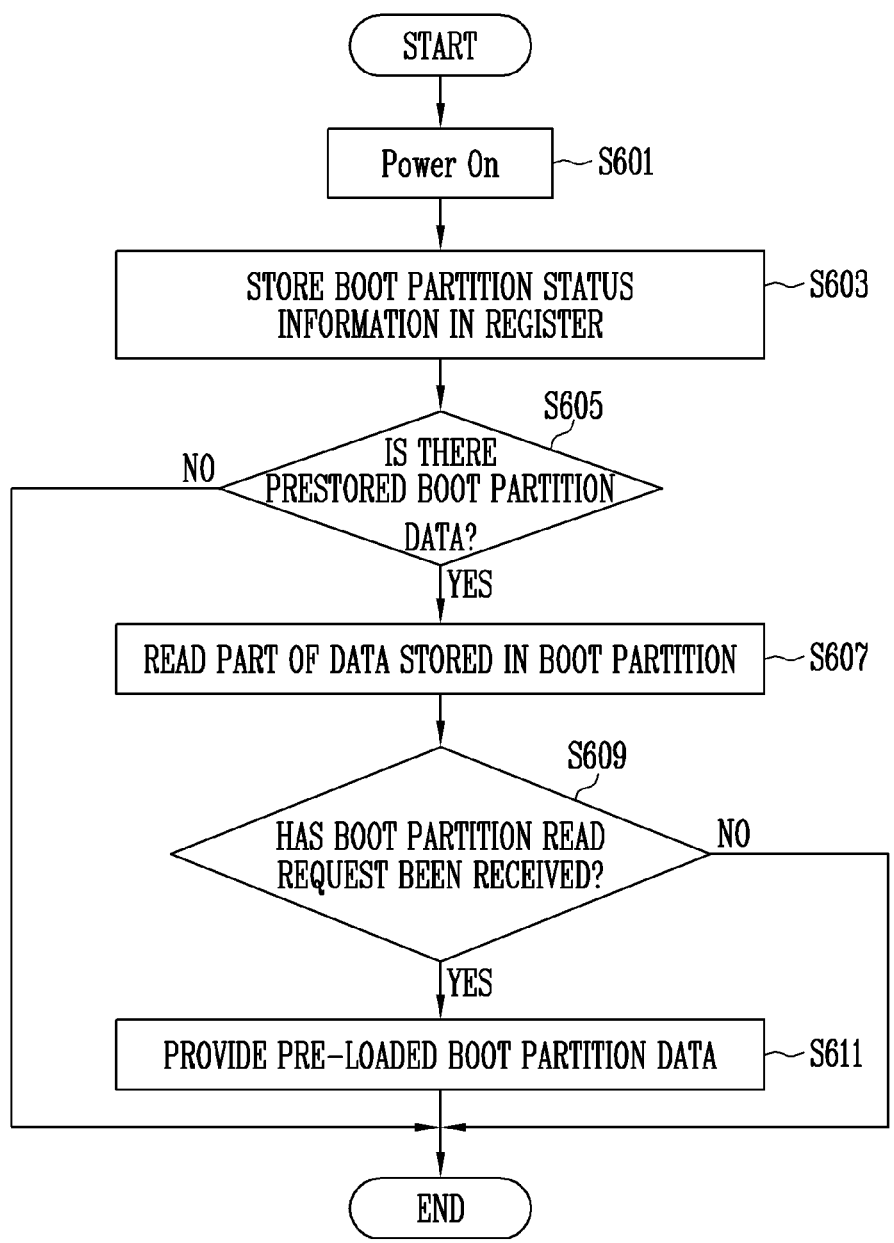
FIG. 6 is a flowchart illustrating a method of operating a data storage device based on an embodiment of the disclosed technology.

FIG. 6 is a flowchart illustrating a method of operating a data storage device based on an embodiment of the disclosed technology.

Referring to FIG. 6, at step S601, the data storage device may be supplied with power.

At step S603, the data storage device may read boot partition status information from a system block, and may store the boot partition status information in a boot partition status register.

At step S605, the data storage device may determine, based on the boot partition status information, whether there is prestored boot partition data. When it is determined at step S605 that there is prestored boot partition data, the process may proceed to step S607, otherwise a preloading operation may be terminated.

At step S607, the data storage device may perform a preloading operation of reading part of the data stored in the corresponding boot partition and storing the read data in a buffer memory.

Depending on whether a boot partition read request has been received from the host at step S609, the data storage device may proceed to step S611 where preloaded boot partition data is provided to the host, or may terminate the preloading operation.

Although not illustrated in the drawing, in an embodiment, boot partition data to be subsequently provided may be read while the preloaded boot partition data is provided to the host at step S611, thus reducing the time it takes to provide subsequent boot partition data.

Figure 7:
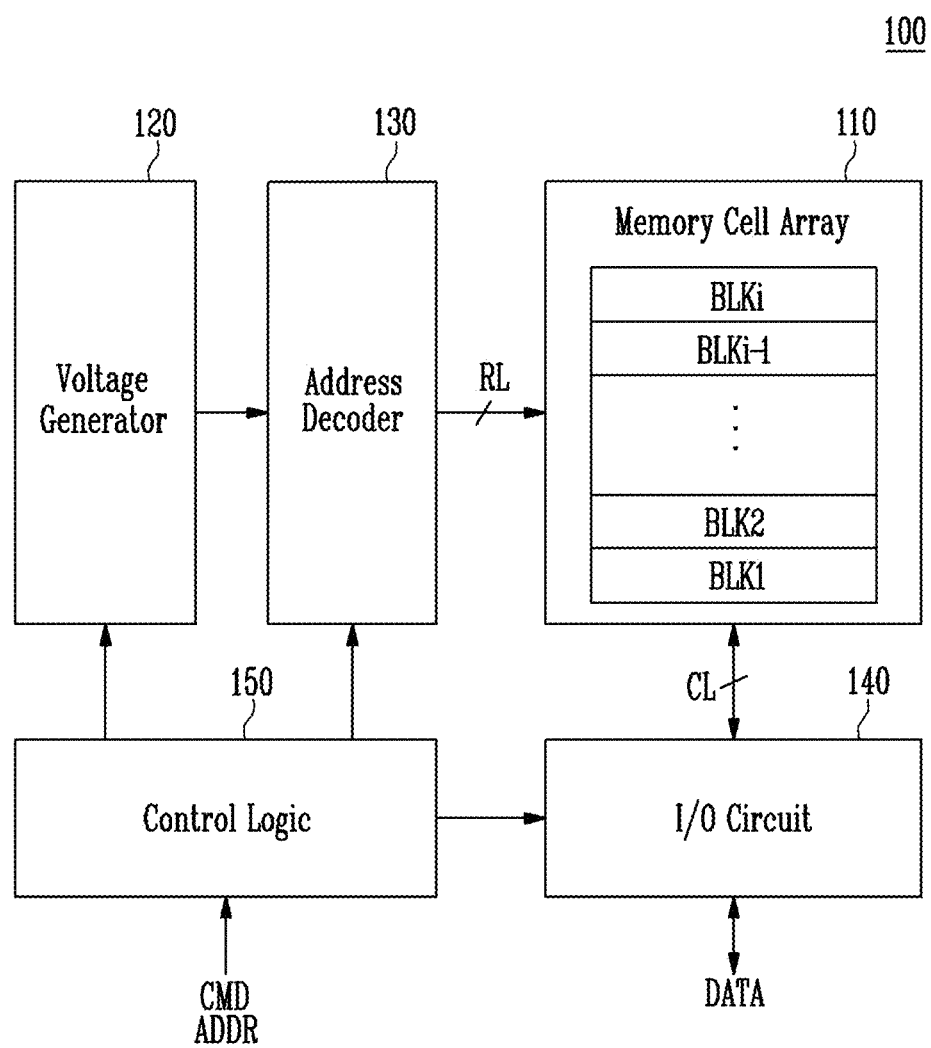
FIG. 7 is a diagram illustrating an example of a memory device of FIG. 1.

FIG. 7 is a diagram illustrating an example of the memory device of FIG. 1.

Referring to FIG. 7, a memory device 100 may include a memory cell array 110, a voltage generator 120, an address decoder 130, an input/output (I/O) circuit 140, and a control logic 150.

The memory cell array 110 includes a plurality of memory blocks BLK1 to BLKi. The plurality of memory blocks BLK1 to BLKi may be coupled to the address decoder 130 through row lines RL. The plurality of memory blocks BLK1 to BLKi may be coupled to the input/output circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 110 may include a plurality of physical pages. Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

In an embodiment, the voltage generator 120, the address decoder 130, and the input/output circuit 140 may be collectively designated as a peripheral circuit. The peripheral circuit may drive the memory cell array 110 under the control of the control logic 150. The peripheral circuit may drive the memory cell array 110 so as to perform a program operation, a read operation, and an erase operation.

The voltage generator 120 may generate a plurality of operating voltages Vop using an external supply voltage that is supplied to the memory device 100. The voltage generator 120 may be operated under the control of the control logic 150.

In an embodiment, the voltage generator 120 may generate an internal supply voltage by regulating the external supply voltage. The internal supply voltage generated by the voltage generator 120 is used as an operating voltage for the memory device 100.

In an embodiment, the voltage generator 120 may generate the plurality of operating voltages using the external supply voltage or the internal supply voltage. The voltage generator 120 may generate various voltages required by the memory device 100. For example, the voltage generator 120 may generate a plurality of erase voltages, a plurality of program voltages, a plurality of pass voltages, a plurality of select read voltages, and a plurality of unselect read voltages.

The voltage generator 120 may include a plurality of pumping capacitors for receiving the internal supply voltage so as to generate a plurality of operating voltages having various voltage levels, and may generate the plurality of operating voltages by selectively enabling the plurality of pumping capacitors under the control of the control logic 150.

The generated operating voltages may be supplied to the memory cell array 110 by the address decoder 130.

The address decoder 130 is coupled to the memory cell array 110 through the row lines RL. The address decoder 130 may be operated under the control of the control logic 150. The address decoder 130 receives addresses ADDR from the control logic 150. The address decoder 130 may decode a block address, among the received addresses ADDR. The address decoder 130 may select at least one of the memory blocks BLK1 to BLKi according to the decoded block address. The address decoder 130 may decode a row address, among the received addresses ADDR. The address decoder 130 may select at least one of word lines of the selected memory block according to the decoded row address. In an embodiment, the address decoder 130 may decode a column address, among the received addresses ADDR. The address decoder 130 may couple the input/output circuit 140 to the memory cell array 110 according to the decoded column address.

In some embodiments of the disclosed technology, the address decoder 130 may apply a read voltage to a selected word line and apply a read pass voltage having a level higher than that of the read voltage to unselected word lines, during a read operation.

In an embodiment, the address decoder 130 may include components such as a row decoder, a column decoder, and an address buffer.

The input/output (I/O) circuit 140 may include a plurality of page buffers. The plurality of page buffers may be coupled to the memory cell array 110 through the bit lines. During a program operation, data may be stored in selected memory cells based on the data stored in the plurality of page buffers.

During a read operation, the data stored in the selected memory cells may be sensed through bit lines, and the sensed data may be stored in the page buffers.

The control logic 150 may control the address decoder 130, the voltage generator 120, and the input/output circuit 140. The control logic 150 may be operated in response to a command CMD transferred from an external device. The control logic 150 may control the peripheral circuit by generating various types of signals in response to the command CMD and the addresses ADDR.

Figure 8:
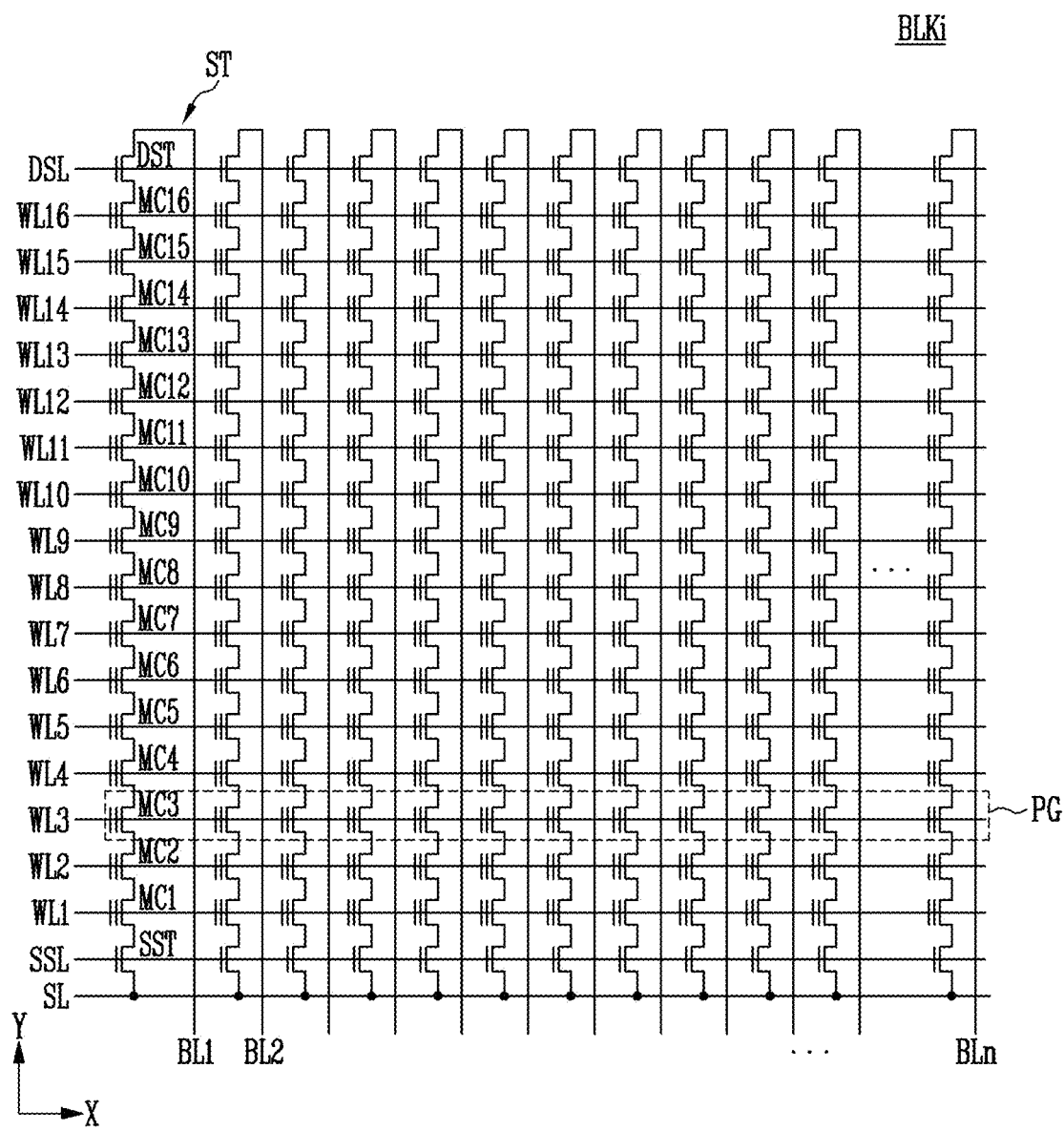
FIG. 8 is a diagram illustrating an example array of one of the memory blocks illustrated in FIG. 7.

FIG. 8 is a diagram illustrating an example array of one of the memory blocks illustrated in FIG. 7.

A memory block BLKi indicates any one memory block BLKi, among the memory blocks BLK1 to BLKi of FIG. 7.

Referring to FIG. 8, a plurality of word lines arranged in parallel to each other may be coupled between a first select line and a second select line. Here, the first select line may be a source select line SSL, and the second select line may be a drain select line DSL. In detail, the memory block BLKi may include a plurality of strings ST coupled between bit lines BL1 to BLn and a source line SL. The bit lines BL1 to BLn may be coupled to the strings ST, respectively, and the source line SL may be coupled in common to the strings ST. The strings ST may be equally configured, and thus the string ST coupled to the first bit line BL1 will be described in detail by way of example.

The string ST may include a source select transistor SST, a plurality of memory cells MC1 to MC16, and a drain select transistor DST which are coupled in series to each other between the source line SL and the first bit line BL1. A single string ST may include at least one source select transistor SST and at least one drain select transistor DST, and may include more memory cells than the memory cells MC1 to MC16 illustrated in the drawing.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells MC1 to MC16 may be coupled to a plurality of word lines WL1 to WL16, respectively. A group of memory cells coupled to the same word line, among the memory cells included in different strings ST, may be referred to as a physical page (PG). Therefore, the memory block BLKi may include a number of physical pages (PG) corresponding to the number of word lines WL1 to WL16.

A single-level cell (SLC) is configured to store one bit of data per cell. In this case, one physical page (PG) may be mapped to one logical page (LPG). The data stored in one logical page (LPG) may include a number of data bits corresponding to the number of cells included in one physical page (PG).

In some implementations, the memory cells can be configured such that one memory cell may store two or more bits of data. In this case, one physical page (PG) may be mapped to two or more logical pages (LPG).

Figure 9:
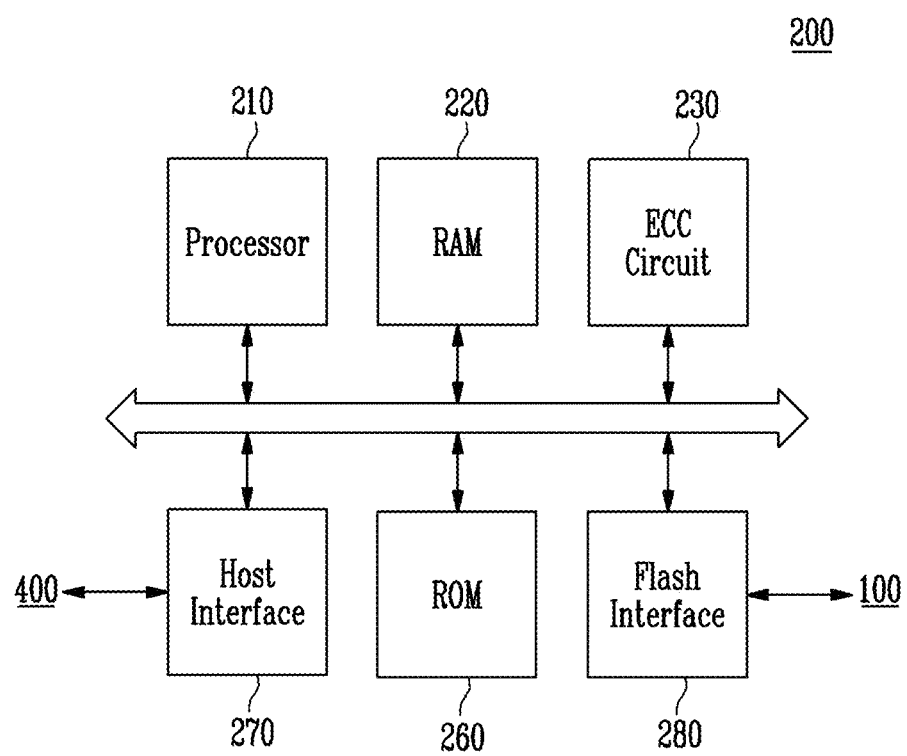
FIG. 9 is a diagram illustrating an example of a memory controller of FIG. 1.

FIG. 9 is a diagram illustrating an example of the memory controller of FIG. 1.

Referring to FIGS. 1 and 9, the memory controller 200 may include a processor 210, a RAM 220, an error correction circuit (ECC) 230, a ROM 260, a host interface 270, and a flash interface 280.

The processor 210 may control the overall operation of the memory controller 200. The RAM 220 may be used as a buffer memory, a cache memory or a working memory of the memory controller 200. In an example, the buffer memory 300, described above with reference to FIG. 1, may be the RAM 220, and may be, for example, an SRAM.

The ROM 260 may store various types of information required for the operation of the memory controller 200 in the form of firmware. In an embodiment, the boot partition manager 210, described above with reference to FIG. 1, may be firmware stored in the ROM.

The memory controller 200 may communicate with an external device (e.g., the host 400, an application processor or the like) through the host interface 270.

The memory controller 200 may communicate with the memory device 100 through the flash interface 280. The memory controller 200 may transmit a command CMD, an address ADDR, a control signal CTRL, etc. to the memory device 100 and receive data DATA from the memory device 100, through the flash interface 280. In an example, the flash interface 280 may include a NAND interface.

Figure 10:
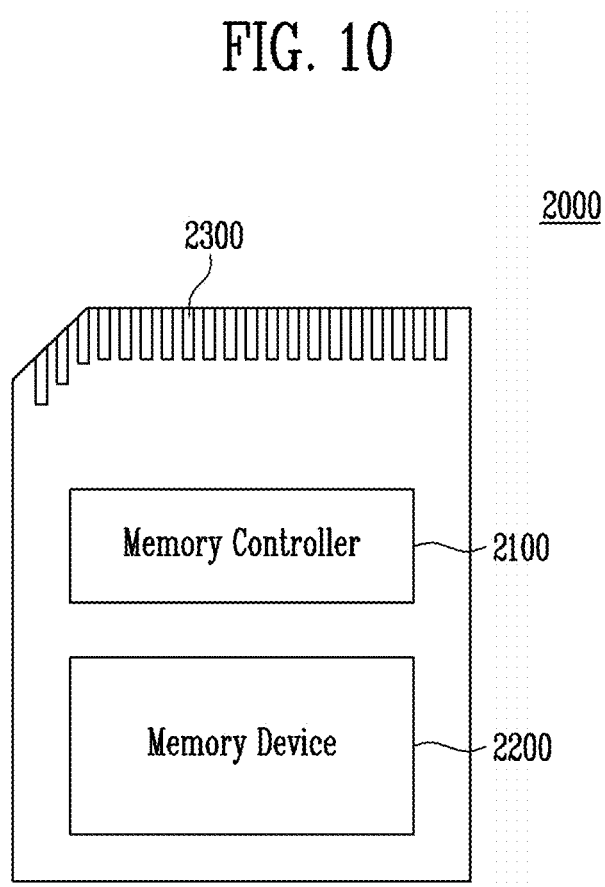
FIG. 10 is a block diagram illustrating a memory card system including a data storage device implemented based on an embodiment of the disclosed technology.

FIG. 10 is a block diagram illustrating a memory card system including a data storage device implemented based on an embodiment of the disclosed technology.

Referring to FIG. 10, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200, described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re- RAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 11:
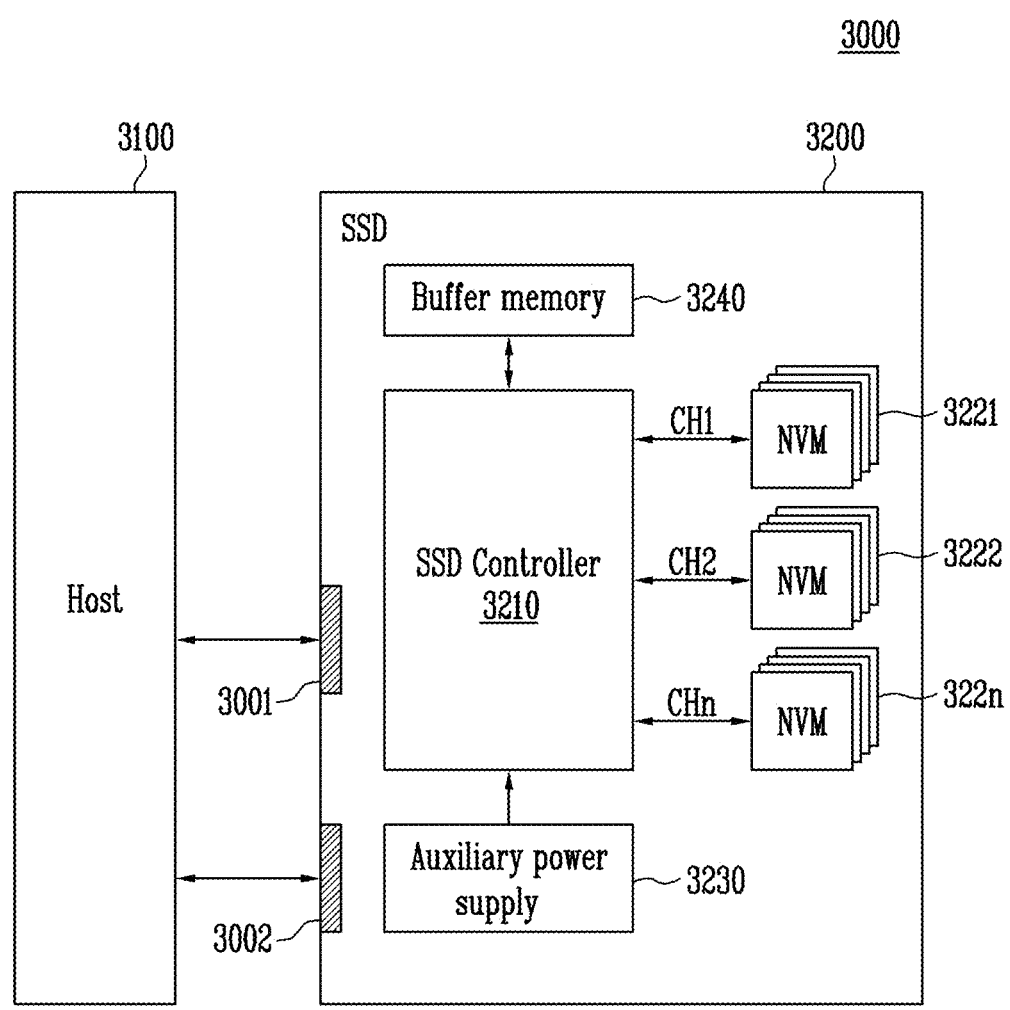
FIG. 11 is a block diagram illustrating a solid state drive (SSD) system including a data storage device implemented based on an embodiment of the disclosed technology.

FIG. 11 is a block diagram illustrating a solid state drive (SSD) system including a data storage device implemented based on an embodiment of the disclosed technology.

Referring to FIG. 11, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of nonvolatile memories 3221 to 322n, an auxiliary power supply 3230, and a buffer memory 3240.

In accordance with an embodiment of the disclosed technology, the SSD controller 3210 may perform the function of the memory controller 200 described above with reference to FIG. 1.

The SSD controller 3210 may control the plurality of nonvolatile memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of nonvolatile memories 3221 to 322n or may temporarily store metadata (e.g., mapping tables) of the nonvolatile memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 12:
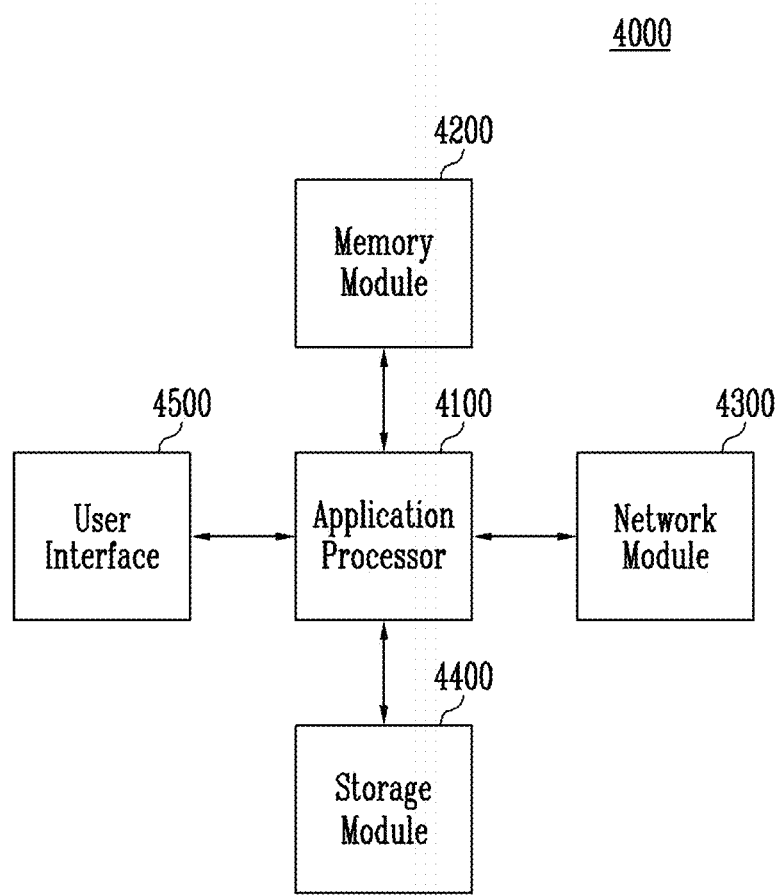
FIG. 12 is a block diagram illustrating a user system including a data storage device implemented based on an embodiment of the disclosed technology.

FIG. 12 is a block diagram illustrating a user system including the data storage device implemented base on an embodiment of the disclosed technology.

Referring to FIG. 12, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the data storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the disclosed technology, there are provided a data storage device having improved response speed and a method of operating the data storage device.

Only a few implementations and examples are described and other implementations, enhancements and variations can be made based on what is described and illustrated in this patent document.

What is claimed is:

1. A data storage device, comprising:
a buffer memory configured to hold data;
a memory device including a user area reserved for storing user data from a host and configured to be accessed by a first procedure, and a boot partition area reserved for storing boot partition data and configured to be accessed by a second procedure different from the first procedure; and
a memory controller coupled to and in communications with the buffer memory and memory device and configured to, upon receipt of power from a power supply, control the buffer memory and the memory device to perform a preloading operation by storing, in the buffer memory, part of the boot partition data from the boot partition area before a request from the host is received, and to provide the part of the boot partition data stored in the buffer memory to the host in response to a read request for the data stored in the boot partition area.

2. The data storage device according to claim 1, wherein the boot partition area includes two or more boot partitions.

3. The data storage device according to claim 2, wherein the two or more boot partitions have data storage spaces of an equal size.

4. The data storage device according to claim 2, wherein a data storage capacity of each of the two or more boot partitions is less than a data storage capacity of one of a plurality of memory blocks included in the memory device.

5. The data storage device according to claim 1, wherein the boot partition area is accessed during the second procedure in response to a second command different from a first command required to access the user area during the first procedure.

6. The data storage device according to claim 1, wherein the boot partition area is accessed in response to a firmware image download command and a firmware commit command.

7. The data storage device according to claim 1, wherein the boot partition area is an area accessed upon authentication using an authentication key.

8. The data storage device according to claim 1, wherein the memory controller comprises:
a boot partition controller configured to control the boot partition area in response to a request from the host;
a boot partition status register configured to store boot partition status information; and
a boot partition preloader configured to perform the preloading operation depending on the boot partition status information.

9. The data storage device according to claim 8, wherein:
the boot partition area includes two or more boot partitions; and
the boot partition status information includes a boot partition identifier (ID) configured to identify each of the two or more boot partitions and activation information indicating whether boot partition data stored in each of the two or more boot partitions is activated.

10. The data storage device according to claim 9, wherein the boot partition status information further includes at least one of security-related information indicating a status as to whether data is capable of being stored or updated in the two or more boot partitions, or update information indicating most recently stored boot partition data, among a plurality of sets of boot partition data respectively stored in the two or more boot partitions.

11. The data storage device according to claim 8, wherein the boot partition controller controls the memory device so that the boot partition status information is stored in the memory device either periodically or randomly.

12. The data storage device according to claim 8, wherein the boot partition controller provides a read command for remaining boot partition data other than the part of the boot partition data to the memory device.

13. The data storage device according to claim 1, wherein the boot partition data is a boot loader for a debugging mode.

14. The data storage device according to claim 1, wherein the boot partition data is associated with an operating system different in type from an operating system of the host.

15. The data storage device according to claim 1, wherein the buffer memory is a volatile memory.

16. A memory controller for controlling a memory device under control of a host, comprising:
a buffer memory configured to hold data; and
a boot partition manager coupled to and in communication with the buffer memory and the memory device, and configured to, upon receipt of power from a power supply, control the buffer memory and the memory device to perform a preloading operation by storing, in the buffer memory, part of boot partition data from a boot partition area included in the memory device before a request from the host is received, and to provide the part of the boot partition data stored in the buffer memory to the host in response to a read request for the data stored in the boot partition area.

17. The memory controller according to claim 16, wherein the boot partition area includes two or more boot partitions.

18. The memory controller according to claim 17, wherein the two or more boot partitions have data storage spaces of an equal size.

19. The memory controller according to claim 16, wherein the boot partition area is an area configured to be accessed in response to a dedicated command.

* * * * *